Patented Nov. 3, 1931

1,830,725

UNITED STATES PATENT OFFICE

FRITZ ULRICH, OF KARNAP, NEAR ESSEN-ON-THE-RUHR, GERMANY, ASSIGNOR TO THE FIRM CARL STILL, OF RECKLINGHAUSEN, GERMANY

EXTRACTION OF PHENOLS FROM AQUEOUS CONDENSATE FROM COAL DISTILLATION

No Drawing. Application filed February 11, 1927, Serial No. 167,584, and in Germany February 15, 1926.

My invention relates to certain improvements in by-product recovery in coke-oven or like plants, and the main object of the invention is the disposal of the phenols contained in effluent water of the said plants in a manner which is far more efficient and economical than the methods previously used.

It is important, both on sanitary and economic grounds, that any effluent waters from plants for the recovery of by-products in coke-oven or like works, should be freed as far as possible from phenols before they are discharged. Many proposals have been made to attain this object, either by destruction of the phenols by chemical or other action, without regard to economic considerations, or by treating the effluent water for recovery of the phenols.

The greater part of that effluent water which gives the main supply of phenols is derived from the residual liquor remaining after distillation of the ammoniacal liquor for recovery of ammonia, and it has been proposed to evaporate this residual liquor, or to use it for quenching the hot coke; these proposals, however, have received but little application. It has also been proposed to decompose and destroy the phenols by means of bacteria, the phenols being converted into the final form of carbon-dioxide. Whether the decomposition is a true bacteriological action, or a pure oxidation process is open to question, but the process does in fact when suitably conducted permit the removal of the greater part of the phenols contained in the effluent. However, apart from the cost of a process of this kind, it is more advantageous on economic grounds to recover the phenols rather than to destroy them, particularly in view of the large quantities of effluent which must be disposed of daily, and the relatively large quantity of phenols contained therein. Thus it has been estimated that a larger quantity of valuable carbolic acid may be lost in the effluent, than is recovered from the tar produced in the plant.

It has been attempted to recover the phenols from the residual liquor from the ammonia distillation plant by a process of extraction with benzol hydrocarbons. This process involves acidification of the liquor in order to liberate the phenols from the calcium phenolates which are formed during the treatment of the ammoniacal liquor with an excess of milk of lime for the purpose of liberating fixed ammonia. Even when the cheapest available acid material is used for the purpose of decomposing the phenolates, for example the acid tar from benzol refining, the process is complicated and expensive, for large quantities of residual liquor have to be extracted, and therefore the losses of benzol are considerable, and cannot be disregarded.

It has therefore been proposed to extract the crude ammoniacal liquor before it is distilled to recover the ammonia, and this process is advantageous in so far as the phenols are present in the crude liquor in a form in which they can be extracted, since the ammonia is practically entirely combined in the form of a carbonate, sulphide or other salt, and besides there is no possibility of the formation of ammonium phenolates which are hydrolytically dissociated either only to a small extent or not at all. However, the extraction of the usual crude ammoniacal liquor by means of benzol hydrocarbons can hardly lead to an economical recovery of the phenols, for the following reasons:—

1. The concentration of the phenols in the crude ammoniacal liquor is very small, so that only a partial extraction is possible, even when a large proportion of benzol is used, for example a quantity amounting to about 80 per cent of the quantity of liquor, for water is itself a good solvent for carbolic acid, and equilibrium is attained when the extraction has proceeded to only about 60 to 70 per cent of the original quantity of phenol. It is not possible by practicable means to influence the equilibrium in such a manner that a larger amount of the total phenols is taken up by the benzol.

2. The quantity of liquor which must be extracted is very great. As an average, a moderately sized coke-oven plant may produce daily about 150–200 cubic metres of crude ammoniacal liquor. Thus the apparatus for recovery of the phenols by this process must be of considerable size.

3. Even under the most favorable conditions, considerable loss of benzol is entailed, for a certain quantity of benzol always remains not only dissolved but also emulsified in the aqueous layer after performing extraction. Only a part of this loss can be eventually compensated and recovered by returning to the gas washers the waste gases containing benzol vapors, which leave the saturator during the subsequent recovery of ammonia from the liquor as ammonium sulphate. However, when the ammonia product to be gained is concentrated ammonia water or ammonium bicarbonate, the recovery of the benzol lost is out of question.

4. The replacement of benzol or light oil, which are expensive, by other solvents for the phenols, can hardly come into consideration, for it is essential that the extracting agent should be one which is to be recovered by easy and convenient processes and which should not introduce other undesirable impurities into the water and thereby defeat the important sanitary object of the process.

The disadvantages and defects mentioned above of the known processes are wholly overcome and an excellent success as to phenol extraction is ensured by my invention which is based on the following considerations:

As is known, the hot gases from coke-ovens must be cooled to atmospheric temperature before they are washed with water for the removal of ammonia. In the cooling plant, there is deposited, besides the tar, a certain quantity of aqueous condensate, of which the water is derived partly from that originally present in the coal, and partly from chemical reactions occurring during carbonization. Ammonium compounds and ammonium salts, among others, ammonium chloride, are present in this aqueous condensate and for this reason, it is the practice to add the aqueous condensate, after separation from the tar, to the ammoniacal liquor going off from the washers.

Now, the present invention which provides a simple process for the recovery of the phenols giving more complete and economical results as compared with the known processes, is based on the observation that the phenols are also present in the aforesaid aqueous condensate and that practically the whole quantity of the phenols which find their way into the effluent-water is derived from the aqueous liquor which condenses in the gas-coolers, when a proper cooling is effected therein.

By this invention, an undesirable excess of effluent-water to be treated for phenol extraction is avoided by treating the aforesaid aqueous condensate from the gas-coolers with suitable means in order to extract the phenols, for example with an organic solvent, before this condensate is mixed with the ammoniacal liquor from the washers in the usual manner for further treatment for recovery of the ammonia by distilling.

The improvement attained may be illustrated by the following data: In a coke-oven plant operating on a coking coal particularly poor in gas, and producing daily about 70 cubic metres of aqueous condensate, and 150 cubic metres of total crude ammoniacal liquor (that is to say, of a mixture of ammoniacal liquor from the washers with the condensate) the content of phenols in the aqueous condensate was 2.45 grams per litre, and in the crude ammoniacal liquor 1.15 grams per litre. It will thus be seen that practically the whole quantity of the phenols in the crude ammoniacal liquor (and therefore in the effluent-water) is derived from the condensate.

Taking for practical purposes the limit of extraction as being attained by equilibrium conditions, when the content of phenols in the liquor undergoing extraction is reduced to 0.6 grams per litre, it will be seen that extraction of the crude ammoniacal liquor will remove $1.15 - 0.6 = 0.55$ grams of phenols per litre, i. e. the proportion of phenols which can be extracted is only about 47.8 percent. If, however, the aqueous condensate is extracted, according to this invention, before it is incorporated with the ammoniacal liquor from gas-washing, then $2.45 - 0.6 = 1.85$ grams of phenols per litre will be removed, giving an extraction effect of about 75.5 percent. Thus the invention is applicable even in cases where extraction of the phenols from the mixed ammoniacal liquors is quite insufficient.

The invention is carried out, in its preferred form, in the following manner:—

The liquor which condenses in the gas-cooling plant is first freed from the tar which invariably accompanies it, for example, by allowing the mixture to stand until the tar has separated, and besides, if necessary, by filtration through a suitable filtering material, such as coke. The liquor separated may also be clarified by treatment with a solid adsorbing agent, for example with coal-dust. This filtration and clarification removes remnants of tar particles which, when remaining present, would interfere with the following extraction treatment by impairing the agents and products. The condensate, freed as far as possible from tar particles, is then treated with a suitable organic solvent to extract the phenols, at ordinary or at raised temperature, and thereafter the aqueous residue is treated for recovery of ammonia in the usual manner, as by distillation. The solvent containing the phenols is treated, by known methods for recovery of the phenols, by fractional distillation. For the purpose of distillation, it is of course necessary that the solvent should have a boiling point which differs suitably from that of the phenols.

The boiling point of the solvent may be either higher or lower than that of the phenols, and the solvent may be re-used continuously in the process.

The process according to the invention may be applied in various cases where condensate liquors of the kind mentioned having a preferred phenol concentration arise. For example, the invention is applicable in the known "Still" process for direct recovery of ammonia from coke oven gases, as described and explained in Letters Patent No. 1,080,938, granted to Carl Still, December 9, 1913.

This process includes the modification that a continuous circulating and repeatedly cooled stream of always one and the same liquid ammonia, which is formed from the condensate of the gas cooling, is used for direct gas cooling without adding foreign water and that a constant increase of this circulating cooling water is effected by ammonia condensate precipitated anew from the gas. This condensate formed anew, which is obtainable from the working of the plant and which is enriched with phenol in the same manner as the aqueous condensate precipitated during the ordinary practice of the by-product recovery by indirect cooling can also be adapted for the recovery of phenol according to the present process.

Special advantages arise for the invention when it is practicable to cool the hot gases in stages, directly or indirectly, by passage through a series of coolers or the like maintained at progressively decreasing temperatures. In this special case it is only necessary to treat those condensates of the particular stages of the cooling which contain the greater part of the phenol. This procedure has the additional advantage that the quantity of condensate requiring phenol extraction may be still further reduced.

Instead of benzol, other relatively cheap solvents may be used for the extraction, for example solvent-naphtha. High-boiling tar oils are also applicable, but in this case, it is advantageous to follow the extraction with a clarification of the phenol-freed condensate by means of a solid adsorbing substance in order to remove admixed remnants of the tar oils. This additional clarification is not, however, absolutely necessary, as practically the same result may be attained in many cases by permitting the condensate to stand for some time.

Although in the foregoing explanations the extraction of the aqueous condensate by means of organic solvents has been specifically mentioned and described it is to be understood that the invention is not limited to special extracting means. Other suitable means serving this purpose would fall into the scope of my invention if their use will result in the essential effects and advantages aimed for.

The invention offers the advantages that much smaller quantities of liquid have to be treated by extraction, so that a smaller apparatus is required; the concentration of phenols in the condensate is much higher than in the crude ammoniacal liquor, so that there is both a relative and an absolute increase in the yield of phenols which can be recovered; the effluent water is more completely freed from phenols, and is less objectionable from the point of view of sanitation; a smaller quantity of solvent is required, and it is possible to use inexpensive oils; moreover, the loss of solvent is smaller.

Besides when it is considered that an increase in the yield of phenols has the particularly important result of an increased output of the valuable carbolic acid, it will be appreciated that the invention is of considerable technical and economical value.

What I claim is:

1. In the recovery of by-products in the carbonization of coal, the step which consists in subjecting to extraction for phenols the aqueous portion, while unweakened as to its original phenol concentration, of the condensate which deposits on cooling the volatile products of the carbonization by means which exclude an appreciable admixture of foreign liquors.

2. In the recovery of by-products in the carbonization of coal, the step which consists in subjecting to extraction with an organic solvent for phenols the aqueous portion, while unweakened as to its original phenol concentration, of the condensate which deposits on cooling the volatile products of the carbonization by means which exclude an appreciable admixture of foreign liquors.

3. In the recovery of by-products in the carbonization of coal, the method which comprises subjecting to extraction with an organic solvent for phenols the aqueous portion, while unweakened as to its original phenol concentration, of the condensate which deposits on cooling the volatile products of the carbonization by means which exclude an appreciable admixture of foreign liquors, and then recovering the extracted phenols from the solution of phenols in the organic solvent.

4. In the recovery of by-products in the carbonization of coal, the combination of steps which comprises cooling the volatile products of the carbonization by means which exclude an appreciable admixture of foreign liquors in stages to obtain a number of fractions of condensate, and then subjecting to extraction for phenols the aqueous portions of said fractions containing the greater part of the phenols while said fractions are unweakened as to their original phenol concentration.

5. In the recovery of by-products in the carbonization of coal, the step which consists in subjecting to extraction with a high-boiling tar oil the aqueous portion, while unweakened as to its original phenol concentration, of the condensate which deposits on cooling the volatile products of the carbonization by means which exclude an appreciable admixture of foreign liquors.

6. In the recovery of by-products in the carbonization of coal, the combination of steps which consists in cooling the volatile products of the carbonization by means which exclude an appreciable admixture of foreign liquors, separating the aqueous portion of the condensate produced, subjecting this portion while unweakened as to its original phenol concentration to extraction with a high-boiling tar oil and thereafter clarifying the treated portion of the condensate.

7. In the recovery of by-products in the carbonization of coal, the combination of steps which consists in cooling the volatile products of the carbonization by means which exclude an appreciable admixture of foreign liquors in stages to obtain a number of fractions of condensate and then subjecting to extraction with a high-boiling tar oil the aqueous portions of said fractions containing the greater part of the phenols while said fractions are unweakened as to their original phenol concentration.

In testimony whereof I affix my signature.

DR. FRITZ ULRICH.